United States Patent [19]
Rogalski

[11] Patent Number: 5,047,860
[45] Date of Patent: Sep. 10, 1991

[54] WIRELESS AUDIO AND VIDEO SIGNAL TRANSMITTER AND RECEIVER SYSTEM APPARATUS

[76] Inventor: Gary Rogalski, 14310 68th Ave., Surrey, 2H5

[21] Appl. No.: 537,482

[22] Filed: Jun. 1, 1990

[51] Int. Cl.$^5$ .................. H04N 7/04; H04N 5/60; H04N 5/38
[52] U.S. Cl. ................... 358/198; 358/143; 358/186; 358/188
[58] Field of Search .............. 358/198, 191.1, 188, 358/186, 143, 144

[56] References Cited

U.S. PATENT DOCUMENTS

| | | | |
|---|---|---|---|
| 3,731,282 | 5/1973 | Dancis | 358/143 |
| 4,620,226 | 10/1986 | Cheung | 358/198 |
| 4,623,921 | 11/1986 | Schmitz | 358/186 |
| 4,646,150 | 2/1987 | Robbins | 358/198 |
| 4,742,393 | 5/1988 | Sugai | 358/188 |

Primary Examiner—Tommy P. Chin
Attorney, Agent, or Firm—Dick and Harris

[57] ABSTRACT

A wireless audio and video signal transmitter and receiver system apparatus capable of accepting both external baseband audio and video signal inputs and a modulated external audio/video signal modulated at a particular television channel. A transmitter transmits an audio/video signal to one or more remote receivers which regenerate the original audio/video signal providing both baseband audio and video signal outputs as well as a modulated audio/video signal output at the particular television channel. The transmitter includes a modulated audio/video signal input section and baseband audio and video signal input sections which provide audio sub-carrier and video baseband signals to a video/RF switch which permits the user to select between modulated and baseband inputs to the transmitter. The audio/video signal is AM modulated and up converted before being transmitted to the receiver. The receiver down converts the received audio/video signal and through which a modulated audio/video signal output section connected to baseband audio and video signal output sections serves to provide both modulated and baseband audio/video signal outputs.

21 Claims, 15 Drawing Sheets

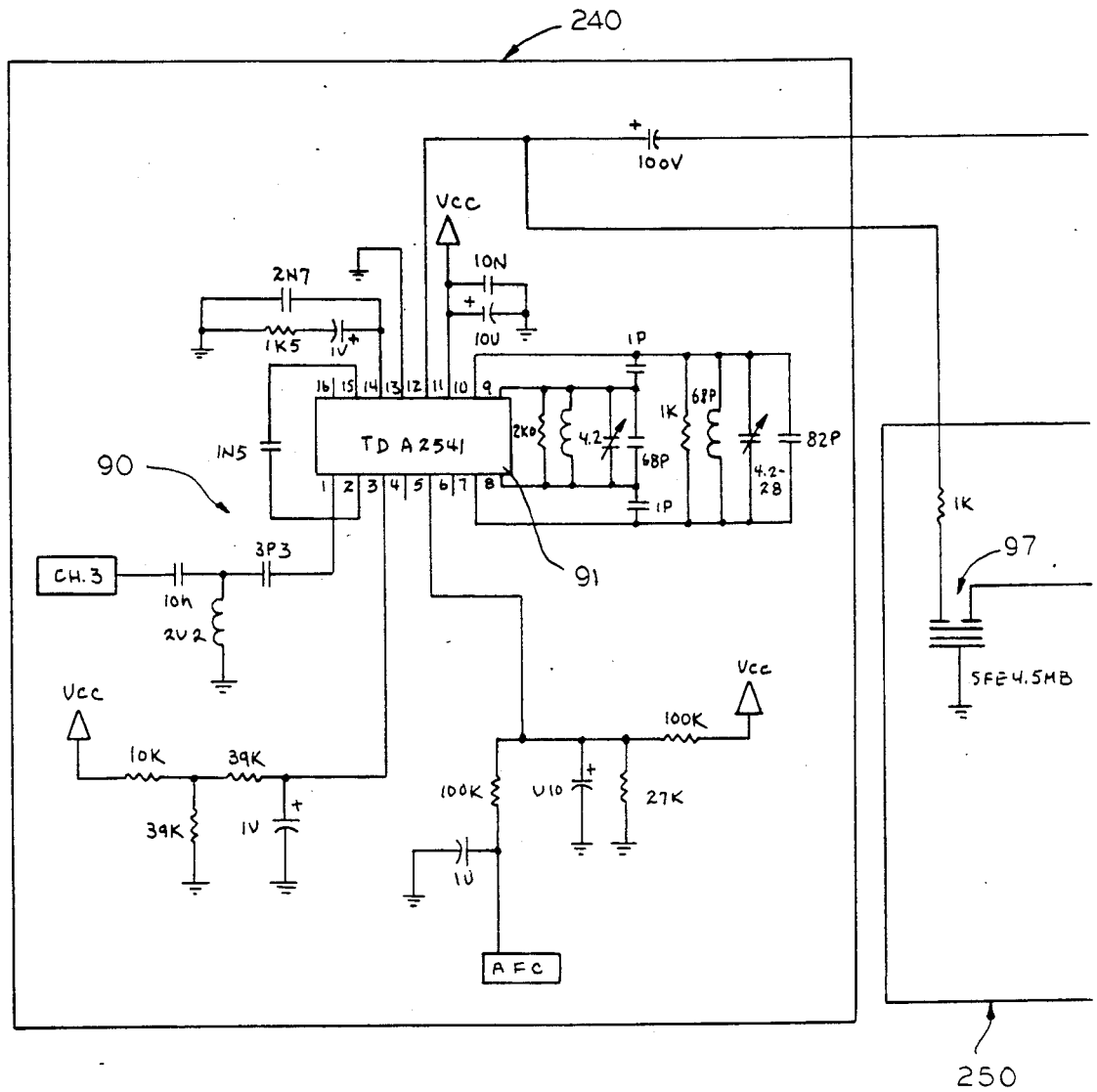
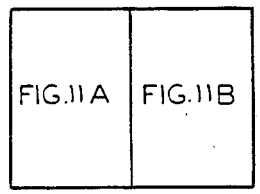
FIG.11A
FIG.11

WIRELESS AUDIO AND VIDEO SIGNAL TRANSMITTER AND RECEIVER SYSTEM APPARATUS

BACKGROUND OF THE INVENTION

The present invention relates generally to the transmission of audio/video television signals, and, in particular, to a wireless audio and video transmitter and receiver system apparatus capable of accepting both external baseband audio and video signal inputs and an external modulated audio/video signal modulated at a frequency corresponding to a particular television channel. In the present wireless audio and video transmitter and receiver system apparatus the transmitter transmits an AM modulated audio/video signal via an RF carrier in the 900 MHz band to one or more remote receivers which regenerate the original audio/video signal providing both baseband audio and video signal outputs as well as a modulated audio/video signal output at the particular television channel.

Advances in technology and manufacturing have resulted in the video cassette recorder (VCR) becoming virtually common place in households which own a television set. In homes owning multiple television sets, the VCR is typically placed adjacent to and hardwire connected to a single designated television set. Should one desire to view a video cassette, one has to view the video cassette on the particular television set to which the VCR is physically attached. Should one wish to view the video cassette on another television set, one alternative is to disconnect the VCR from its designated television set and reconnect the VCR to a remote television. Another alternative consists of hardwire connecting multiple television sets to a single VCR using multiple selector switches to "make" the desired connections to cause the VCR's audio/video signal to be directed to the desired television set. Likewise, if one desires to view a television program which is supplied to the homeowner via a cable television network, the television which the homeowner wishes to view must be connected to the cable television network.

In theft prevention and other security applications, where video cameras are utilized, video cameras must each be physically hardwired to a monitoring station, or recording device, often located at distances remote from the camera's location. In such situations, great lengths of connecting wire may be required, connections which are susceptable to damages over time and/or cutting by one attempting to defeat a security camera.

The limitations of such physical connections are apparent in that one must either physically move the VCR about the house or endure the expense and/or unsightliness of having wires run from television to television as well as risk damage to any connecting cables. Accordingly the present invention seeks to address these limitations by providing for the wireless transmission and reception of television signals on an RF band of 900 MHz by taking advantage of revised FCC regulations which have allocated the band of 902 MHz to 928 MHz for this application.

Moreover, the present invention seeks to provide for a flexible wireless transmission and reception of television signals in a manner which provides for the best possible television picture at the remote television set using the least costly combination of components.

Accordingly, it is an object of the present invention to provide a wireless audio and video signal transmitter and receiver system apparatus capable of accepting both a modulated audio/video signal and baseband audio and baseband video signals as inputs to a transmitter.

It is additionally an object of the present invention to provide for the user to select between the external modulated audio/video signal and external baseband audio/video signals as inputs to the transmitter.

It is yet a further object of the present invention to convert the external modulated audio/video signal input and the baseband audio and video signal inputs to common audio subcarrier and baseband video signals to permit the selection between said inputs to be performed with a mechanical switch in place of costly RF switching components.

It is still a further object of the present invention to provide a receiver which down converts a received RF signal to an IF frequency corresponding to a modulated audio/video signal in turn corresponding to a standard television channel frequency, so as to provide for the direct interface to a television set.

It is a further object of the present invention to provide for the user to select between two RF channels of 914 MHz and 919 MHz for transmission of an audio/video signal by providing for the user selectable AM modulation at IF frequencies of 245 MHz and 250 MHz.

It is an object of the present invention to provide for filtering of the received audio/video signal without the use of SAW filters.

These and other objects of the invention will become apparent in light of the present specification and drawings.

SUMMARY OF THE INVENTION

The present invention comprises a wireless audio and video signal transmitter and receiver system apparatus capable of accepting both external baseband audio and video signal inputs and an external modulated audio/video signal modulated at a particular television channel, such as television channel 3. The wireless audio and video signal transmitter and receiver system apparatus serves to transmit an audio/video signal to one or more remote receivers which regenerate the original audio/video signal providing both baseband audio and video signal outputs as well as a modulated audio/video signal output at the predetermined particular television channel.

In the preferred embodiment of the invention, the modulated external audio/video signal is modulated at channel 3, such that the transmitter accepts a channel 3 input, in addition to the baseband inputs. The receiver thus regenerates the channel 3 output, in addition to the respective baseband video and audio outputs.

Transmitter means are provided for connection to an audio/video signal source, such as a video cassette recorder (VCR), and is capable of accepting an external modulated audio/video signal input, such as channel 3, as well as external baseband audio and video signal inputs, which inputs are typically provided as RCA jack terminals on the connector portions of VCRs.

The transmitter means includes modulated audio/video signal input means for permitting an external audio/video modulated signal source to be connected to the transmitter means wherein the modulated audio/video signal input means serves to convert the external modulated audio/video signal into a first internal baseband video signal and a first internal audio sub-carrier signal which both correspond to the external modulated audio/video signal input. Baseband audio signal input means are provided for permitting an external baseband audio signal source to be connected to the transmitter means. The baseband audio signal input means serves to convert the external baseband audio signal into a second internal audio sub-carrier signal.

Baseband video signal input means are provided for permitting an external baseband video signal source to be connected to the transmitter means. The baseband video signal input means provides as an output a second internal baseband video signal.

In order to permit the user of the wireless audio and video signal transmitter and receiver system apparatus to select between the external modulated audio/video signal modulated at the particular television channel and the baseband audio and video signal as an input to the transmitter means, a video/RF switch is provided. The video/RF switch is operably and electrically connected to the modulated audio/video signal input section, the baseband audio signal input section and the baseband video signal input section of the apparatus. The video/RF switch means thus serves to permit the user to select between the first internal audio sub-carrier signal and the second internal audio sub-carrier signal, and the first internal baseband video signal and the second internal baseband video signal. The switching of audio sub-carrier signals and baseband video signals in the manner contemplated by this invention can be performed with a mechanical switch thus obviating the need for the use of an RF switch since both alternative inputs to the video/RF switch are at audio sub-carrier and video baseband frequencies respectively. The video/RF switch thus provides as an output the user selected audio sub-carrier signal and the user selected baseband video signal.

The transmitter means further includes video filter means operably and electrically connected to the baseband video signal output of the video/RF switch. The video filter means serves to remove any audio sub-carrier components from the baseband video signal output of the video/RF switch.

The modulated audio/video signal input means likewise serves to remove unwanted video signal components from the audio sub-carrier signal which, however, is performed prior to the audio sub-carrier signal passing through the video/RF switch.

AM modulator means is provided and is electrically connected to the audio sub-carrier signal output of the video/RF switch means and the filtered video signal output of the video filter means. The AM modulator means serves to AM modulate both the filtered video signal output and the audio sub-carrier signal output towards converting said signals to a modulated IF frequency audio/video signal. The output of the AM modulator means is connected to the up converter means which serves to convert the modulated IF frequency signal to an RF frequency signal.

RF amplifier means are provided and are electrically connected to the up converter means and serves to amplify the RF frequency signal generated by the up converter means.

Transmitter antenna means are provided and electrically connected to the RF amplifier means for transmitting the amplified RF signal to the one or more receiver means.

One or more receiver means are provided, each of which is capable of providing an external modulated audio/video signal output as well as external baseband audio signal and baseband video signal outputs.

Receiver antenna means are provided with each receiver means for receiving the RF signal transmitted by the transmitter means.

Receiver front end means is electrically connected to receiver antenna means and serves to amplify and filter the received RF signal. Down converter means, electrically connected to the receiver antenna means, are provided and serves to convert the received RF signal to an IF signal which has a frequency corresponding to the carrier frequency for the modulated audio/video signal. In the example referred to above, the down converter means converts the received RF signal to an IF signal having a frequency corresponding to television channel 3.

Receiver filter means are provided and are electrically connected to the down converter means. The receiver filter means provides a filtered IF signal output by removing from the IF signal frequency components above and below the frequency of the modulated audio/video signal as well as frequencies which may be present due to the local oscillator present in the down converter operation.

Modulated audio/video signal output means are electrically connected to the receiver filter means for providing a modulated audio/video signal output on the particular television channel, in the present example, channel 3.

Modulated audio/video signal demodulator means are provided and are electrically connected to the receiver filter means. The modulated audio/video signal demodulator means serves to provide a composite audio and video output signal. Baseband audio signal output means are electrically connected to the modulated audio/video signal demodulator means and serves to provide a baseband audio signal output. Likewise, baseband video signal output means are provided and are electrically connected to the modulated audio/video signal demodulator means and serves to provide a baseband video signal output. Accordingly, the wireless audio/video signal transmitter and receiver system apparatus permits the wireless transmission and remote reception of audio/video signals from the signal source, such as a VCR, to a reception device, such as a television monitor, which monitor is located remote from and not physically connected to the signal source.

In one embodiment of the invention, the wireless audio and video signal transmitter and receiver system apparatus includes down converter means which converts the received RF signal directly to an IF signal which corresponds to the carrier frequency for television channel 3, namely, 61.25 MHz. In this manner, the IF signal provided by the down converter means can be directly provided to the receiver means as a television channel 3 interface having a full double-side band signal which results in minimal degradation of picture quality.

In the preferred embodiment of the invention the transmitter means of the wireless audio and video signal transmitter and receiver system apparatus transmits the audio/video signal on one of two user selectable RF channels. In the embodiment illustrated, those channels are 914 MHz and 919 MHz. This is accomplished by providing for the user selectable AM modulation of the audio sub-carrier and baseband video signals such that AM modulation occurs at IF frequencies of 245 MHz and 250 MHz which correspond to RF frequencies of 914 MHz and 919 MHz respectively.

The receiver means of the wireless audio and video signal transmitter and receiver system apparatus preferably further includes modulated audio/video signal bypass means. Modulated audio/video signal bypass means are operably and electrically connected to the modulated audio/video signal output means of the receiver and serves to connect the transmitted RF signal to the output of the modulated audio/video signal output means when the transmitter and receiver system apparatus is in use. The modulated audio/video signal bypass means further serves to alternatively connect a modulated audio/video signal source applied to the receiver means to the output of the modulated audio/video signal output means when the receiver is not in use. The television monitor connected to the receiver means will receive the output of the receiver means directly when the system apparatus is in use and, alternatively, will thus receive an auxiliary input to the receiver means when the receiver is not in use, such auxiliary input typically being an additional signal source such as a local antenna, VCR, or cable system connection.

In the preferred embodiment of the invention, the modulated audio/video signal input means comprises modulated audio/video signal input connector means for accepting connection of the external modulated audio/video input signal. First modulated audio/video signal detector means are provided for converting the external modulated audio/video signal input to a composite internal baseband video signal and an audio sub-carrier signal. Further included are audio sub-carrier filter and amplifier means electrically connected to the modulated audio/video signal detector means for removing unwanted video information from the audio sub-carrier signal towards providing a first internal audio sub-carrier signal. The modulated audio/video signal input means further includes video buffer means electrically connected to the modulated audio/video signal detector means for providing the first internal baseband video signal.

The baseband audio signal input means of the present apparatus preferably comprises baseband audio signal input connector for accepting connection of the external baseband audio signal, pre-emphasis network means which are electrically connected to the baseband audio signal connector. The pre-emphasis network means serves to boost the high frequency components of the internal baseband audio signal toward removing noise components when the signal is demodulated. Baseband audio sub-carrier modulator is included and is electrically connected to the pre-emphasis network means and serves to modulate the external baseband audio signal thereby generating an audio sub-carrier signal output. Audio sub-carrier buffer means are electrically connected to the baseband audio sub-carrier modulator towards providing as an output therefrom a second internal audio sub-carrier signal.

The baseband video signal input means of the present apparatus comprises a baseband video signal input connector for accepting connection of the external baseband audio signal.

In the present invention, the video/RF switch comprises a double-pole double-throw switch the first half of which permits the selection between the first internal audio sub-carrier signal and the second internal audio subcarrier signal. The second half of the double-pole double-throw switch serves to permit the selection between the first internal baseband video signal and the second internal baseband video signal.

The baseband video filter of the present apparatus preferably comprises a baseband video filter amplifier electrically connected to the second half of the video/RF switch, baseband video filter buffer electrically connected to the baseband video filter amplifier and baseband video filter lowpass filter electrically connected to the baseband video filter buffer. The baseband video filter amplifier, video filter buffer and video filter lowpass filter serve to remove unwanted audio sub-carrier frequency component from the baseband video signal.

The AM modulator means of the present apparatus provides a double-side band output signal at 245 MHz or 250 MHz, in the present preferred embodiment of the invention. The AM modulator means further includes balanced to unbalanced converter electrically connected to the AM modulator means, bandpass filter electrically connected to the balanced to unbalanced converter, variable attenuator electrically connected to the bandpass filter and an amplifier electrically connected to the variable attenuator. In addition, matching pad and lowpass filter connected in series to the AM modulator amplifier all of which serves to remove spurious and harmonic components from the modulated audio/video signal, which spurious and harmonic components may otherwise interfere with other operating devices.

The up converter means of the present invention utilizes a fixed local oscillator to convert the modulated audio/video signal to an RF signal. The RF amplifier means to which the signal passes in the present invention comprises a bandpass filter, matching pad, amplifier, combination highpass/notch filter, two amplifiers and lowpass filter all of which are connected in series. The transmitter antenna comprises a coax balun and dipole antenna which serves to transmit the RF signal to the receiver.

The receiver antenna means comprises a loop antenna and a coax balun which is connected to the receiver front end means which comprises an amplifier, input bandpass filter centered at 917 MHz and a high gain amplifier connected in series. The input filter provides image rejection at 795 MHz.

The receiver filter means preferably comprises a lowpass filter, amplifier, bandpass filter all connected in series serving to eliminate undesired frequency components above and below the external modulated audio/video signal (channel 3) and the frequency components which are generated by the local oscillator present in the down converter means.

The modulated audio/video signal output means of the present apparatus comprises a signal output attenuator electrically connected to the receiver means for controlling signal strength, signal output buffer electrically connected to the attenuator means and modulated audio/video signal output connector electrically connected to the signal output buffer.

In the present invention, the modulated audio/video signal demodulator means preferably comprises highpass filter electrically connected to the receiver filter means, a second modulated audio/video signal detector means for providing a composite audio/video signal corresponding the modulated audio/video signal input to the transmitter means and second detector means electrically connected to the audio/video signal demodulator highpass filter.

The baseband audio signal output means of the present invention preferably comprises an audio subcarrier output bandpass filter electrically connected to the modulated audio/video signal demodulator means for filtering out unwanted video signal components. Audio sub-carrier demodulator means are electrically connected to the audio subcarrier bandpass filter for demodulating the audio subcarrier signal and converting the signal to the baseband audio signal, amplifier is electrically connected to the sub-carrier detector and de-emphasis means are electrically connected thereto.

The baseband video signal output means of the preferred embodiment of the invention comprises video output buffer electrically connected to the modulated audio/video signal demodulator means, video output lowpass filter electrically connected to the video output buffer for filtering out undesired audio components from said video signal, video output level control means electrically connected to the video output lowpass filter and final video output buffer electrically connected to the video output level control means.

In the present embodiment of the invention, the modulator audio/video signal means further includes modulated audio/video signal output connector which is electrically connected to the audio/video signal input connector and which provides a modulated audio/video signal output signal which corresponds to the input signal. In this manner, the signal source which is applied to the transmitter may be connected in such a manner as to bypass the transmitter and connect to a television monitor at the transmitting end of the system. Likewise, the baseband audio signal input means and the baseband video signal input means each further respectively include baseband audio signal output connector and baseband video signal output connector connected to the respective baseband audio signal input connector and baseband video signal input connector towards providing such "bypass" operation of the transmitter.

In operation, the transmitter of the present invention is connected to the signal sources, typically a VCR as one source and a second source such as a camcorder. The input source selection is then performed through actuation of the video/RF switch on the transmitter. The transmitter may be operated on either of two RF channels, channel A or channel B. Alternate selection permits the user to select a second channel if interference is present on the first channel. Of course, the receiver is to be set on the same RF channel as the transmitter. The baseband outputs of the receiver can be used to connect to the input of a VCR while the modulated signal output can be connected directly to the VHF input of the television set. In the present invention, both the baseband and modulated outputs of the receiver are available simultaneously.

At the receiver, a VHF/UHF input is provided for connection to a variety of VHF/UHF television signal sources. For example, the VHF/UHF input can be the channel 3 output of another VCR or a cable signal. When the receiver power is turned off, whatever signal is applied to the VHF/UHF input is looped through to the channel 3 output.

BRIEF DESCRIPTION OF THE DRAWINGS

FIG. 11 of the drawings is composed of FIGS. 11A and 11B.

FIGS. 11A and 11B are schematic circuit diagrams illustrating the modulated audio/video signal demodulator means, baseband audio signal output means and baseband video signal output means of the receiver means of the present invention; and, FIG. 12 of the drawings is a schematic circuit diagram of the power supply for the receiver means of the present invention.

DETAILED DESCRIPTION OF THE DRAWINGS

Figure 1:
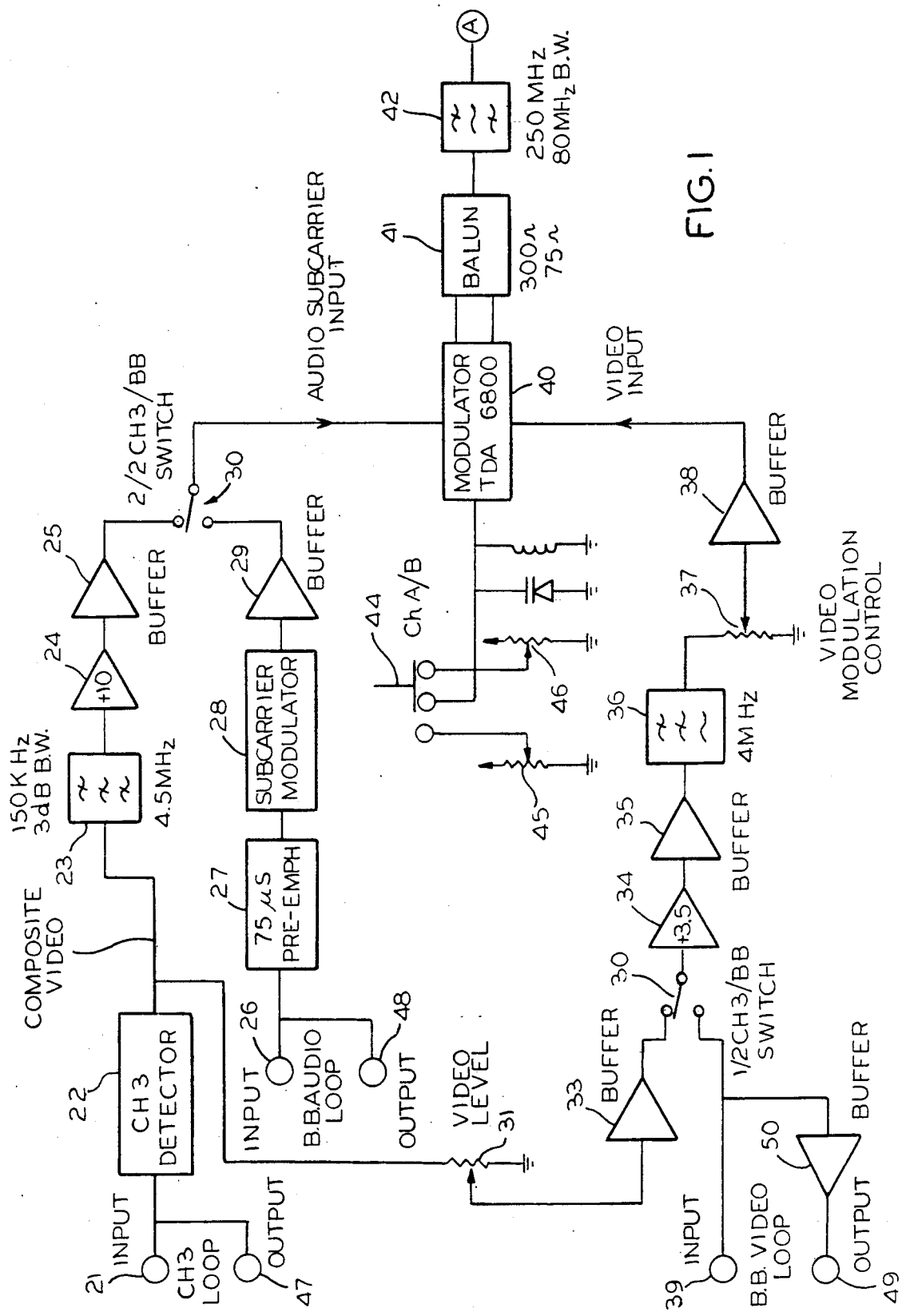
FIG. 1, FIG. 2 and FIG. 3 of the drawings comprise a block diagram illustrating the functional modules of the transmitter means comprising the present invention.

While this invention is susceptible of embodiment in many different forms, there is shown in the drawings and will herein be described in detail a specific embodiment, with the understanding that the present disclosure is to be considered as an exemplification of the principles of the invention and is not intended to limit the invention to the embodiment illustrated.

Figure 2:
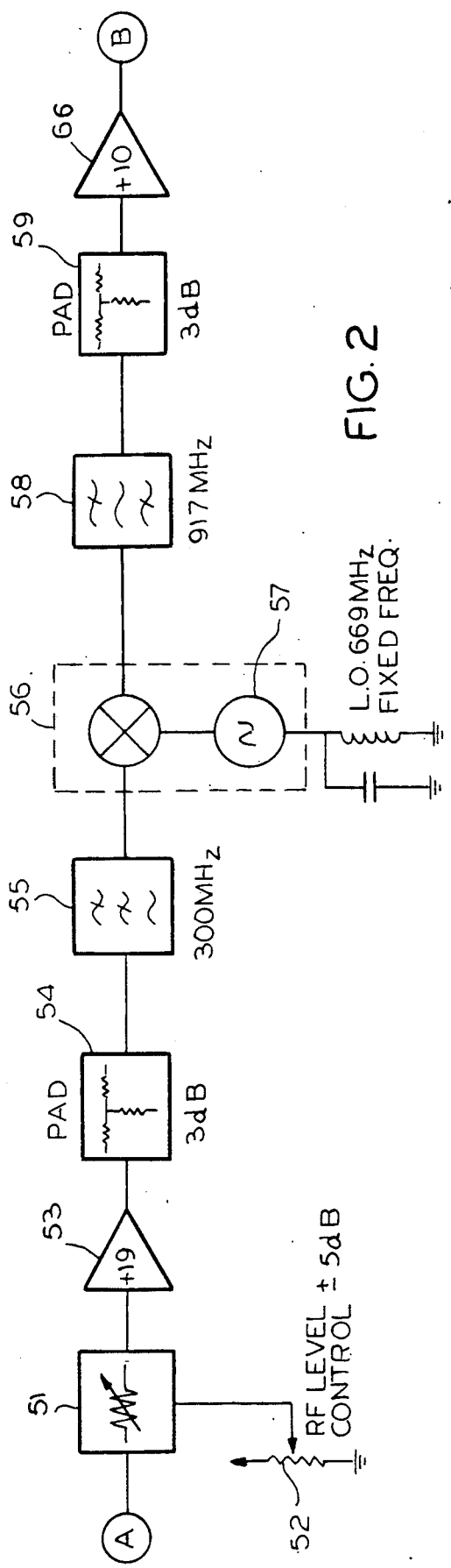
Figure 3:
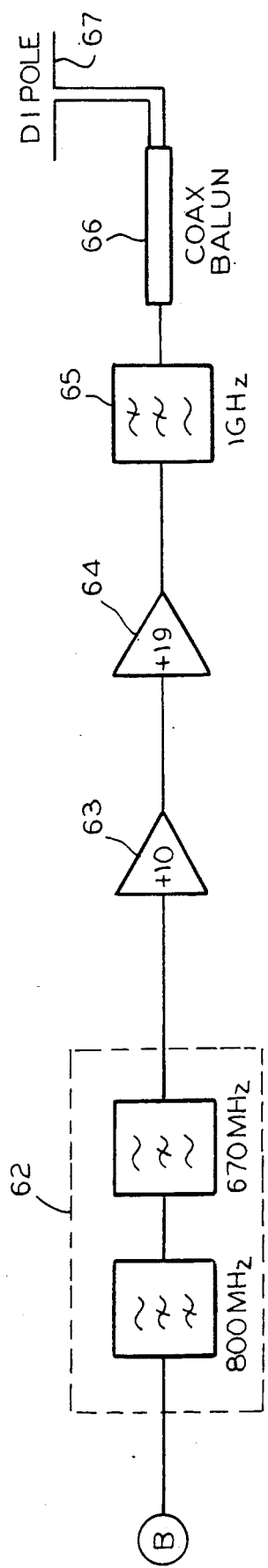

FIG. 1 through 3 of the drawings is a block diagram of the transmitter 20 of the present wireless audio and video signal transmitter and receiver systems apparatus. Modulated audio/video signal input 21 comprises a connection point for connecting the external modulated audio/video signal input to the transmitter 20. In operation, the external modulated audio/video signal will typically comprise a channel 3 television signal. Connector 21 is shown attached to modulated audio/video signal detector 22 which is herein referred to as a channel 3 detector 22, though it may of course be configured to detect any other channel should that be required. Channel 3 detector 22 receives as its input the modulated external audio/video signal and serves to demodulate this signal to generate a composite baseband video and audio sub-carrier signal FM modulated at 4.5 MHz. Bandpass filter 23 is shown electrically connected to channel 3 detector 22. Bandpass filter 23, amplifier 24 and buffer 25 serve to filter out the unwanted video signal components of the composite signal such that the output of buffer 25 consists of the audio subcarrier signal FM modulated at 4.5 MHz and is substantially free of interfering signal components.

Baseband audio signal input connector 26 provides a connection point at which an external baseband audio signal may be connected to transmitter 20. Connector 26 is shown connected to pre-emphasis network 27. Pre-emphasis network 27 is shown comprising a 75 microsecond device which serves to provide noise reduction by boosting high-frequency components of the baseband audio signal before transmission. Sub-carrier modulator 28 and buffer 29 serve to modulate the baseband audio signal such that the output of buffer 29 is an FM modulated audio sub-carrier signal at 4.5 MHz and thus equivalent to the subcarrier audio signal output of buffer 25.

Video level control 31 is shown comprising a variable resistor and is connected to the output of channel 3 detector 22. Video buffer 33 is shown connected to video level control 31. Buffer 33 serves to prevent undesirable loading of the circuitry.

Baseband video signal input connector 39 serves to connect transmitter 20 to the external baseband video signal. Channel 3/baseband switch 30 is shown comprising a double-pole double-throw mechanical type switch. The first half of switch 30 switches between the output of buffer 33 and baseband video signal input connector 39 so as to permit selection between the external baseband video signal and the internal baseband video signal generated by channel 3 detector 22. The second half of switch 30 switches between the output of buffer 25 and the output of buffer 29 permitting the selection between internal audio sub-carrier signal generated by the output of buffer 25 and the second internal audio sub-carrier signal generated by the output of buffer 29, respectively.

The output of the first half of switch 30 is shown connected to amplifier 34, buffer 35, lowpass filter 36, video modulation control 37 and buffer 38, all of which are shown connected to one another in series and which together serve to remove any audio sub-carrier component such that the output of buffer 38 is a substantially spurious free baseband video signal.

The baseband video input connector 39 is preferably a 75 Ohm input connector.

The video baseband signal and the audio subcarrier signal from switch 30 is applied to AM modulator 40 which is shown comprising a TDA 6800 modulator. AM modulator 40 accepts both the baseband video signal and the audio sub-carrier signal from the output of the video/RF switch 30 and converts the signal to an IF of either 245 MHz or 250 MHz as determined by the setting of channel switch 44. The two IF frequencies correspond to the two RF channels of 914 MHz and 919 MHz. The output of AM modulator 40 is an AM double-side band signal at 245 MHz or 250 MHz which is put through a balanced to unbalanced converter 41 and then to a bandpass filter 42. Bandpass filter 42 is centered at 250 MHz and has a 3 dB bandwidth of 80 MHz. Filter 42 serves to reduce harmonic level.

To select between the two RF channels of 914 MHz and 919 MHz, the AM modulator frequency is switch 44 selectable. Switch 44 switches between two voltages set by adjustable voltage dividers 45 and 46.

Channel 3 output connector 47 is shown connected to channel 3 input connector 21. Baseband audio signal connector output 48 is shown connected to baseband audio signal input connector 26 and baseband video output connector 49 is shown connected to baseband video input connector 39 via buffer 50. Output connectors 47, 48 and 49 serve to provide for a throughput connection of the applied channel 3 input and baseband audio and video inputs respectively so as to preclude the use of external splitters.

FIG. 2 of the drawings is a continuation of FIG. 1. The output of bandpass filter 42 is fed to variable attenuator 51, to amplifier 53 and then into 3 dB matching pad 54 and lowpass filter 55. Variable resistor 52 is shown providing a DC level control for RF variable attenuator 51.

Up converter 56 accepts the IF signal at either 245 or 250 MHz and through the use of a fixed local oscillator 57 set at 669 MHz converts the IF signal to an RF signal of 914 or 919 MHz depending upon setting of channel switch 44.

The output of up converter 56 is fed to the RF amplifier stage comprising bandpass filter 58, a three pole bandpass filter centered at 917 MHz with a 3 dB bandwidth of 30 MHz, matching 3 dB pad 59 and then to amplifier 60. The output of amplifier 60 is fed to combination highpass filter/notch filter 62 having a cutoff frequency of 800 MHz and a notch at the local oscillator frequency of 669 MHz so as to provide spurious and harmonic signal reduction and notch out signal leakage from local oscillator 57. The signal is then sent through two matching pads/amplifier sections 63 and 64 and then finally into a 1 GHz lowpass filter at which point all out of band spurious signals are at least 50 dB below the level of the desired RF output.

The output of the 1 GHz lowpass filter is coupled through a three-quarter wave section of RG 178 coaxial transmission line to couple to the dipole antenna 67. The coax line serves as a balun 66 to drive the dipole antenna 67 by providing an unbalanced to balanced converter.

Figures 4, 4A:
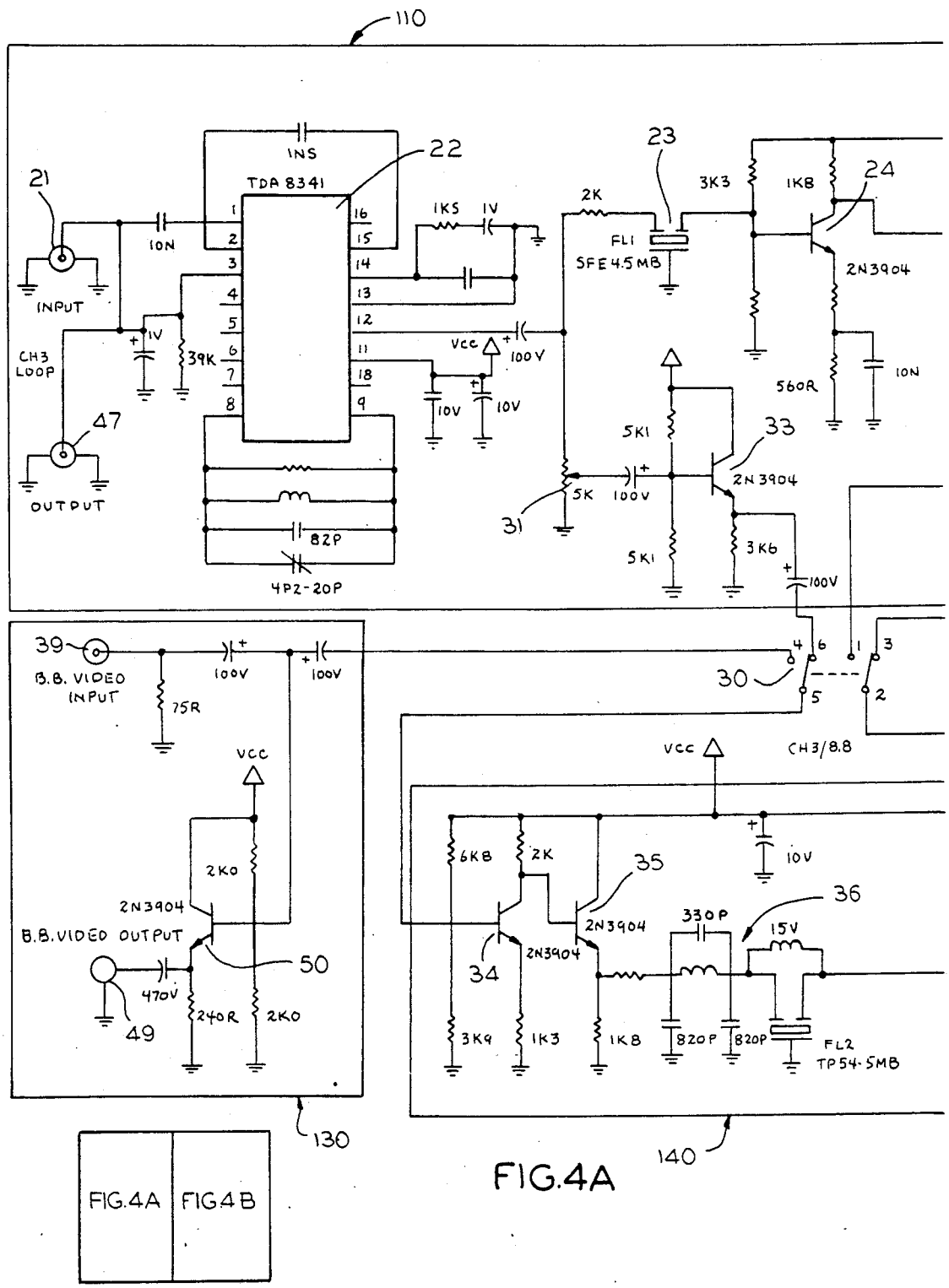
FIG. 4 of the drawings is comprised of FIGS. 4A and 4B.
FIGS. 4A and 4B are schematic circuit diagrams illustrating the modulated audio/video signal input means, baseband audio signal input means, baseband video signal input means and video/RF switch means of the transmitter means of the present invention.
Figure 4B:
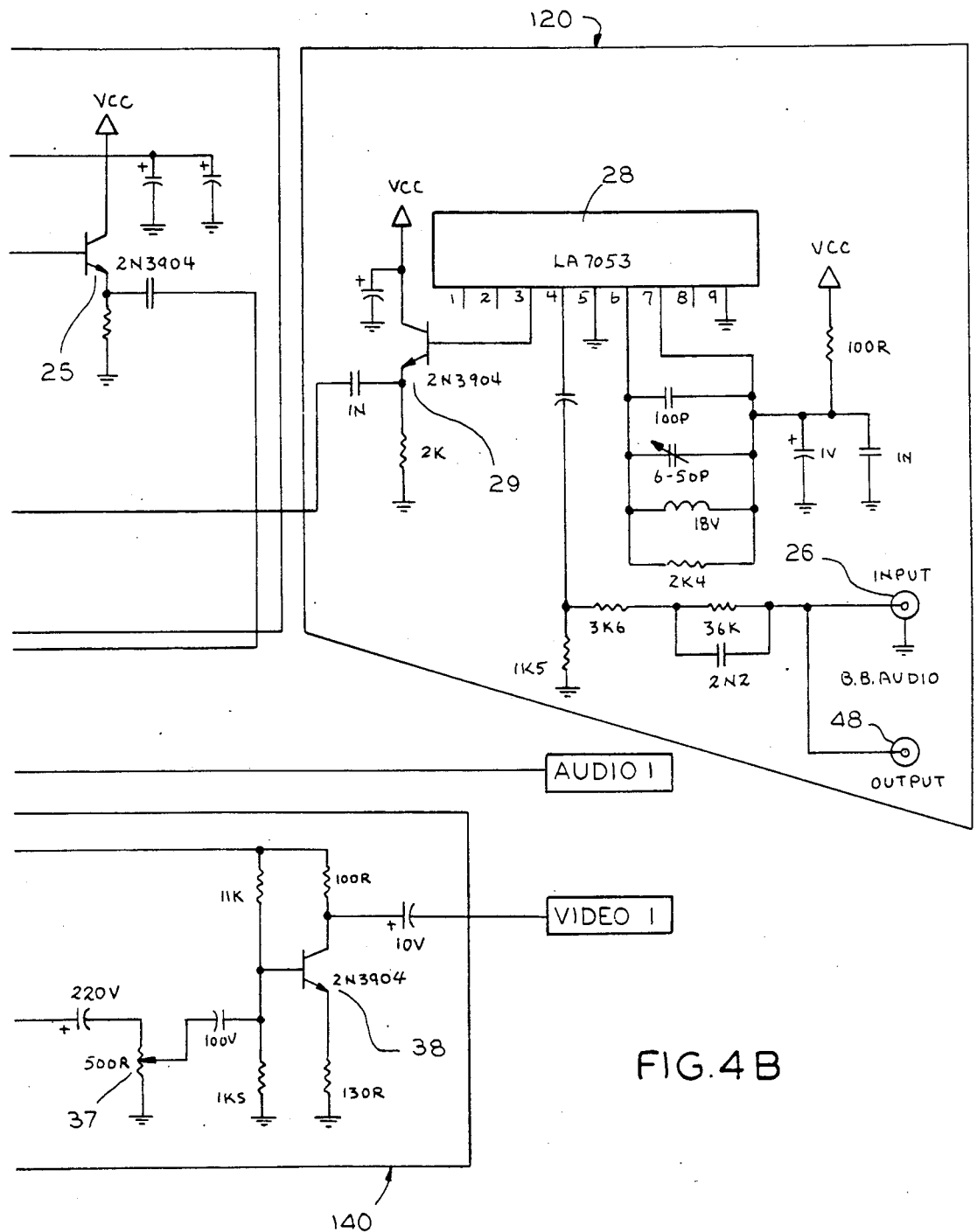

FIG. 4A and 4B of the drawings together illustrate a portion of transmitter 20 and specifically the modulated audio/video signal input means 110, baseband audio signal input means 120, baseband video signal input means 130, video/RF switch 30, and video filter means 140.

The modulated audio/video signal input means 110 is shown comprising a channel 3 input to transmitter 20 which is shown comprising input connector 21 which is in turn connected to channel 3 detector 22 comprising a TDA 8341 integrated circuit the output on which on pin 12 comprises a composite video signal incorporating baseband video signal and audio sub-carrier signal FM modulated at 4.5 MHz. The output of channel 3 detector 22 is connected to bandpass filter 23, amplifier 24 and buffer 25. As shown, amplifier 24 comprises a type 2N3904 transistor as does buffer 25. Video level control 31 is shown comprising a variable 5k resistor the output of which is connected to buffer 33 comprising a type 2N3904 transistor the output of which terminates on pin 6 of video/RF switch 30.

Baseband audio signal input means 120 is shown comprising baseband audio signal input connector 26 which is shown connected to pre-emphasis network 27 which comprises a 36k Ohm resistor in parallel with a 2N2 capacitor. Subcarrier modulator 28 shown comprising a type LA7053 integrated circuit the output of which on pin 3 is connected to buffer 29 a type 2N3904 transistor the output of which terminates on pin 1 of video/RF switch 30.

Baseband video input means 130 includes external baseband video connector 39 which is shown terminating on pin 4 of video/RF switch 30 which itself is shown comprising a double-pole double-throw mechanical switch the outputs of which appear on pins 5 and 2 such that pin 2 contains the selected audio sub-carrier signal while pin 5 the selected baseband video signal. As illustrated, the video/RF switch 30 is in the "RF" setting whereby the channel 3 input is selected.

The output of the baseband video signal in pin 5 of video/RF switch 30 is shown connected to video filter 140 comprising amplifier 34, buffer 35 and lowpass filter 36 where amplifier 34 and buffer 35 each comprise a type 2N3904 transistor. The output of lowpass filter 36 is connected to variable resistor 37 providing control over video modulation and comprises a 500 Ohm variable resistor the output of which is connected to buffer 38 a 2N3904 transistor.

Figure 5:
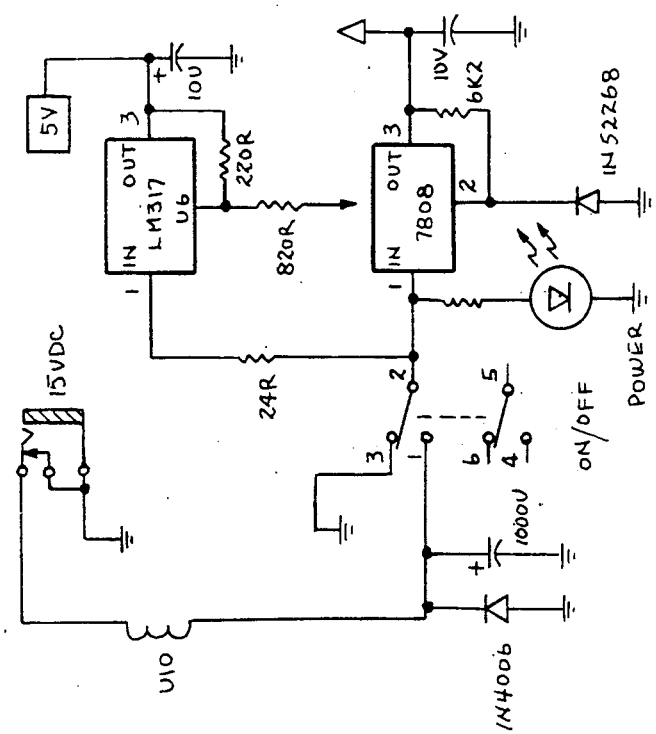
FIG. 5 of the drawings is a schematic circuit diagram of the power supply circuitry for the transmitter means of the present invention.

FIG. 5 of the drawings is a schematic illustration of the power supply circuitry for transmitter 20. The operation of this power circuit should be readily discernible to those skilled in the art.

Figure 6A:
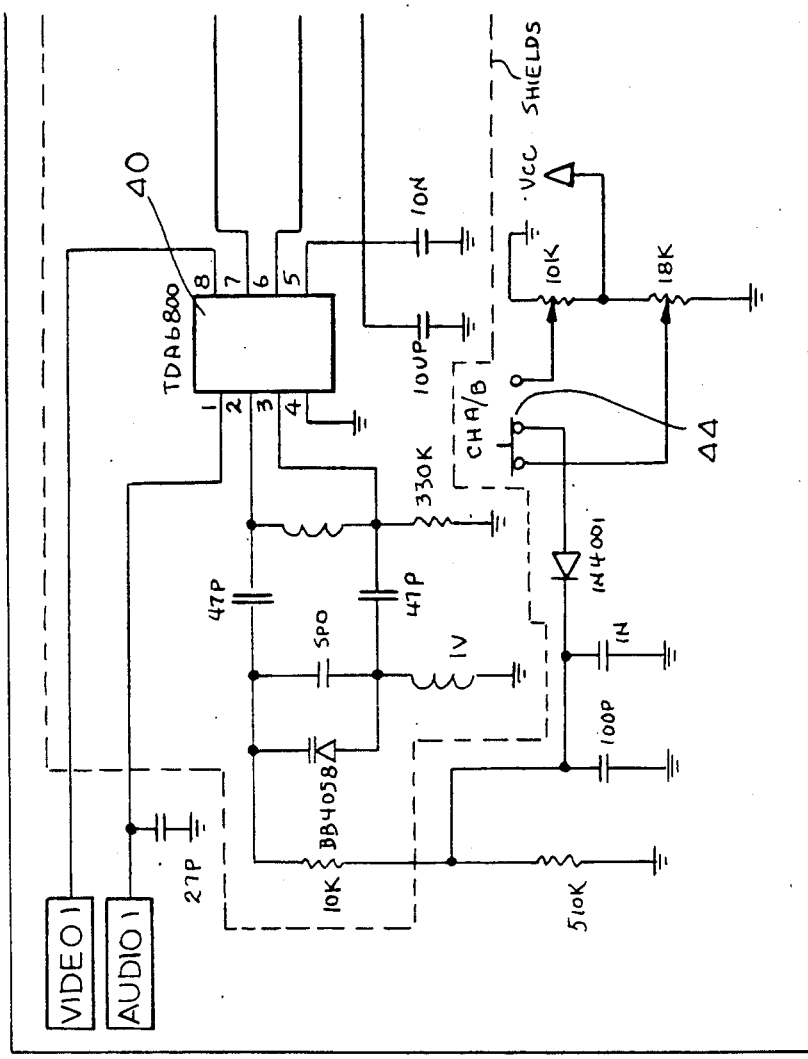
FIGS. 6A and 6B are schematic circuit diagrams of the AM modulator means of the transmitter means of the present invention.
Figure 6:
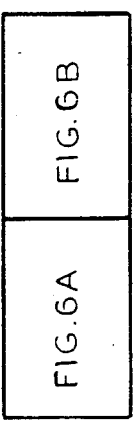
FIG. 6 of the drawings is composed of FIGS. 6A and 6B.
Figure 6B:
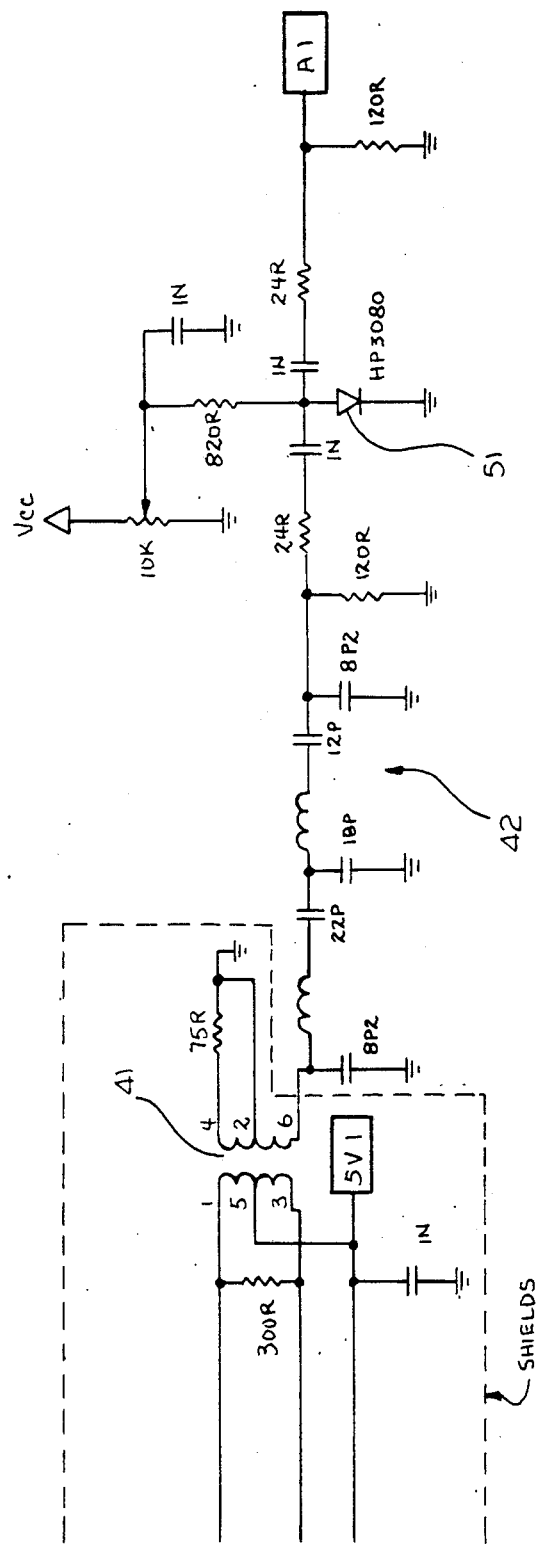

FIGS. 6A and 6B of the drawings together with 7A and 7B disclose the remainder of the transmitter 20.

AM modulator means 150 includes AM modulator 40 which is shown as comprising a TDA 6800 IC and accepts the baseband video signal on pin 8 and audio sub-carrier signal on pin 1 the outputs of which on pin 7 and 6 are connected to balun 41. Slide switch 44 serves to permit the selection at which frequency 245 MHz or 250 MHz AM modulator 40 operates at, so as to correspond to RF channels 914 MHz and 919 MHz. Balun 41, shown in FIG. 6A comprises a balanced to unbalanced converter which is connected to bandpass filter 42 and then to variable attenuator 51. Variable attenuator comprises in part an HP3080 diode controlled by a 10k variable resistor. The dashed lines appearing on FIGS. 6A and 6B, and throughout the drawings, which surround various groups of components are indicated as comprising shields which serve to preclude the emission from the apparatus of spurious and harmonic signals.

Figures 7, 7A:
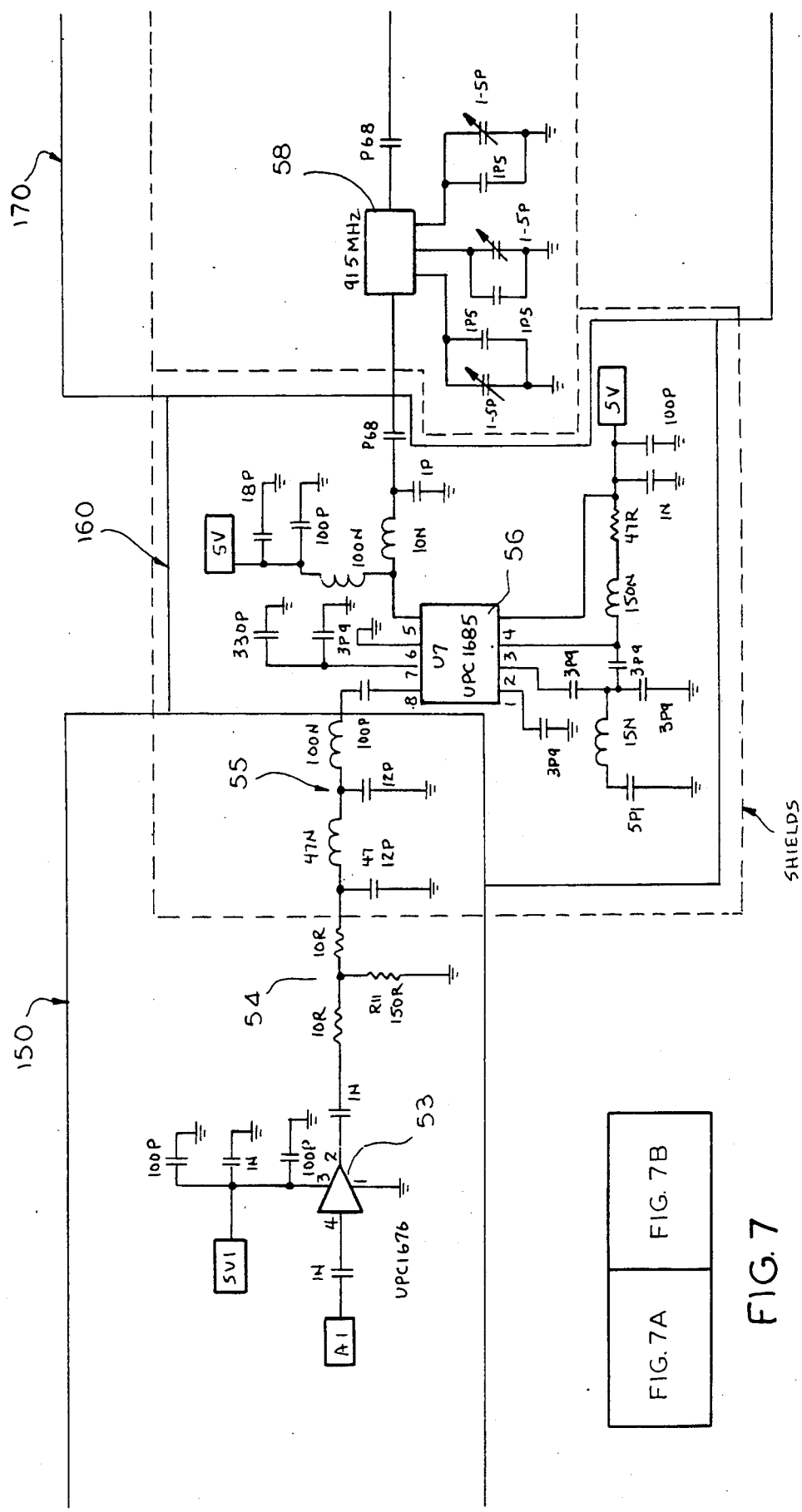
FIG. 7 of the drawings is composed of FIGS. 7A and 7B.
FIGS. 7A and 7B are schematic circuit diagrams of the up converter means, RF amplifier means and transmitter antenna means of the transmitter means of the present invention.

As shown, FIG. 7A illustrates amplifier 53 which comprises a UPC1676 hybrid AMP integrated circuit the output of which is connected to a matching pad 54 serving to provide matching with subsequent lowpass filter 55 comprising the inductor capacitor network shown.

Up converter section 160 includes up converter 56 which is shown comprising an integrated circuit having contained therein local oscillator 57 namely a type UPC1685 IC.

Figure 7B:
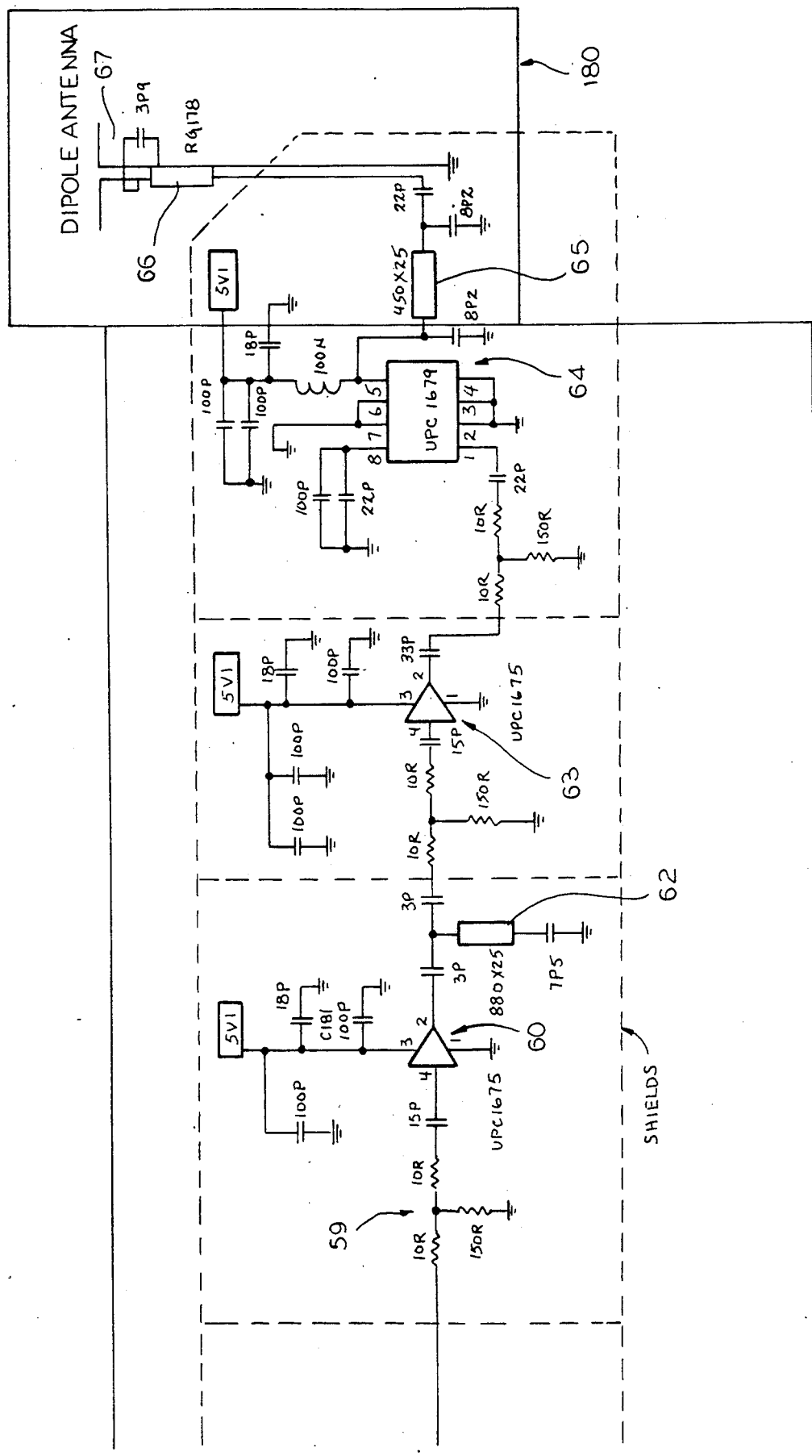

RF amplifier section 170 is shown in FIG. 7A and 7B where the output of up converter 56 pin 5 is connected to bandpass filter 58 as shown. Matching pad 59 the input of which is connected to bandpass filter 58. Amplifier 60 is shown comprising a UPC1675 hybrid AMP the output of which is connected to combination highpass/notch filter 62 which is shown comprising a microstripline. Amplifiers 63 and 64 are shown comprising UPC1675 and UPC1679 integrated circuits respectively. Lowpass filter 65 is shown comprising a microstripline device.

The transmitter antenna section 180 of the invention includes coax portion 66 composed of type RG 178 coax for connection to dipole antenna 67.

Figure 8:
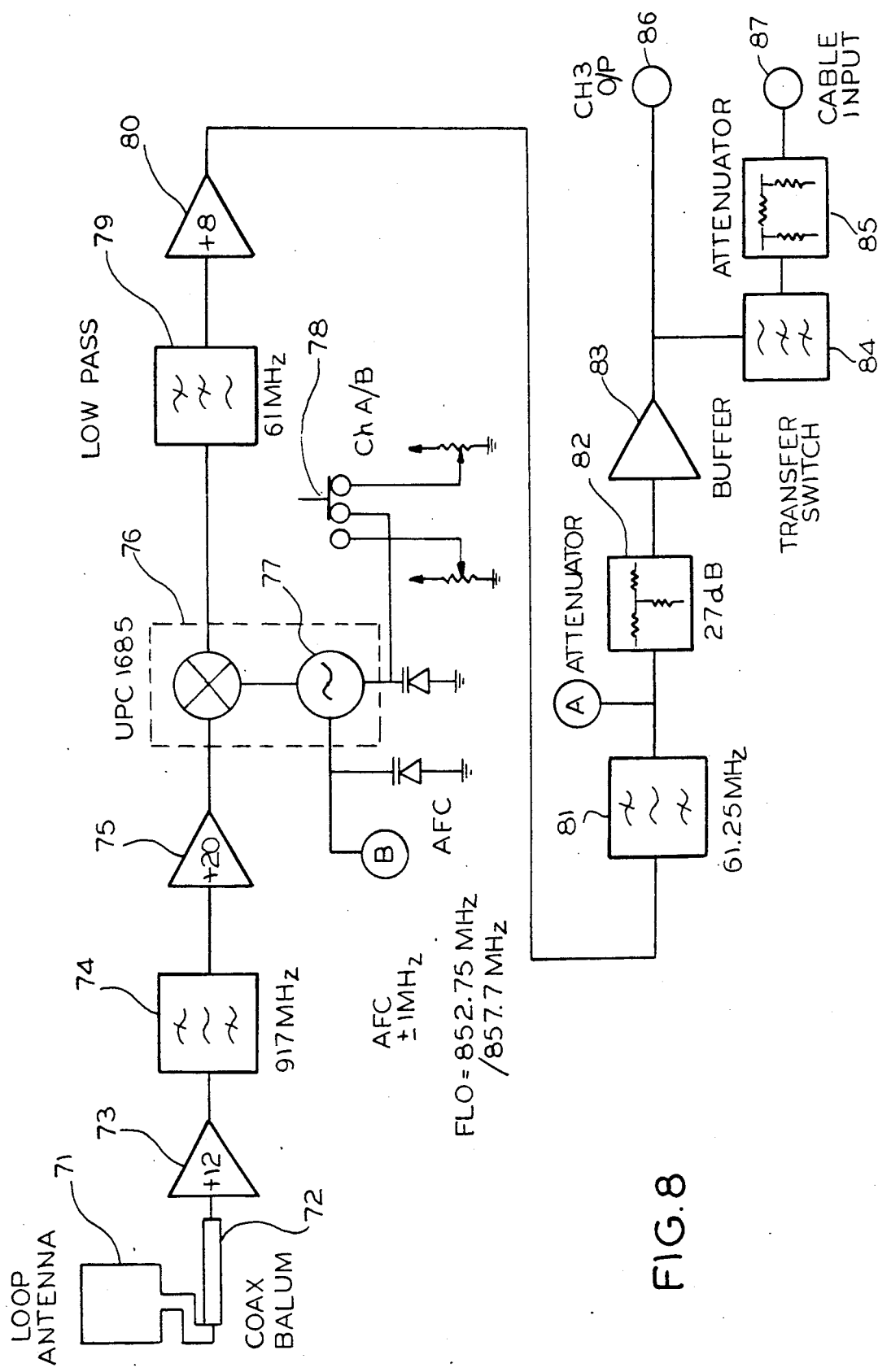
FIGS. 8 and 9 of the drawings comprise a block diagram illustration of the functional modules of the receiver means of the present invention.
Figure 9:
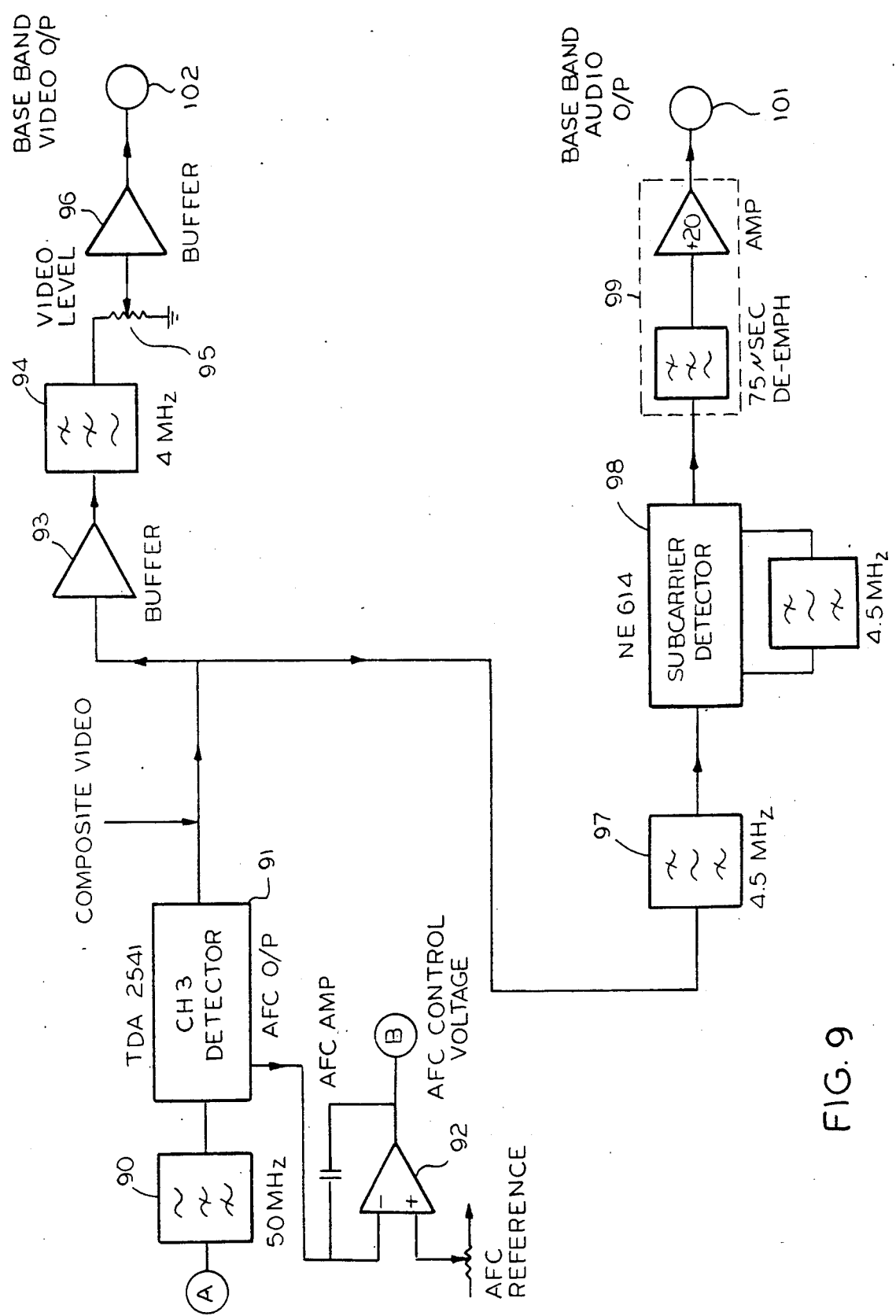

FIG. 8 and 9 of the drawings illustrate in block diagram form the functional modules comprising receiver 70. A UHF loop antenna is used as receiver antenna 71. A section of RG 178 coaxial cable which serves as coax balun 72 is used to connect the loop antenna to amplifier 73 and then to bandpass filter 74 which is a two pole bandpass filter centered at 917 MHz having a 3 dB bandwidth of 40 MHz. Filter 74 provides greater than 30 dB of image rejection at 795 MHz. The output of bandpass filter 74 is fed into a high gain amplifier 75.

Down converter 76 is shown as comprising a UPC1685 integrated circuit which converts the received RF input signal directly to the channel 3 carrier frequency of 61.25 MHz. To select between the two RF channels of 914 MHz and 919 MHz, the local oscillator portion 77 of down converter 76 is switch 78 selectable between 852.75 MHz and 857.75 MHz. Switch 78 switches between two voltages set by adjustable voltage dividers. This voltage is applied across a varactor diode in the oscillator tank circuit of the down converter 76. Each voltage divider can adjust the local oscillator frequency by plus/minus 35 MHz. The output of the down converter is fed to lowpass/notch filter 79 and then to amplifier 80. From the output of amplifier 80, the signal is applied to the input of a two pole bandpass filter 81 centered at 61.25 MHz with a 3 dB bandwidth of 8 MHz. From the output of bandpass filter 81 the signal splits. A branch shown in FIG. 8 passes through attenuator 82, buffer 83 and then to channel 3 output connector 86. Attenuator 82 assures that the RF level will not exceed −40 dBm even when the transmitter is located very close to the receiver.

FIG. 9 of the drawings illustrates the other branch from bandpass filter 81 which is connected to highpass filter 90 and then to channel 3 detector a TDA 2541 demodulator integrated circuit. Channel 3 detector 91 provides AFC control voltage for local oscillator 77 of down converter 76 by means of AFC amplifier 92. The output of channel 3 detector is a composite video signal from which is generated a baseband video output 102 and a baseband audio 101.

Cable input 87 is shown comprising a VHF/UHF input which is applied to a highpass filter switch configuration comprising attenuator 85 and transfer switch 84. The operation of this switch is such that when the receiver power is on the cable input signal is shunted to ground and only the transmitted signal appears at the channel 3 output 86. When the receiver power is turned off, the cable input signal on connector 87, or whatever is applied to 87, is looped directly to the channel 3 output 86. The cable input may be a straight channel 3 signal, from a VCR or a wide band cable signal.

The first branch of the channel 3 detector 91 output is applied to the input of a video buffer 93 and then is fed through a lowpass filter 94 having a 3 dB cufoff of 4.2 MHz and a 30 dB notch at 4.5 MHz. From the output of lowpass filter 94, the signal is passed through a level control 95 and then through a final output buffer 96 to the baseband video output connector 102. The video output level is 1 Vp-p into 75 Ohms fed from a low impedance source.

The other branch from channel 3 detector 91 is fed through bandpass filter 97 centered at 4.5 MHz with a 3 dB bandwidth of 150 kHz. From the output of the subcarrier bandpass filter 97, the signal is applied to the input of an FM detector IC 98 from which is derived the baseband audio output. The baseband audio output from the FM detector 98 is fed through an amplifier 99 with a 75 microsecond de-emphasis characteristic and then to audio output connector 101. With a plus or minus 50 kHz, deviation on the subcarrier, the output level will be between 0.8 and 1.0 Vp-p into a 600 Ohm load.

Figures 10, 10A:
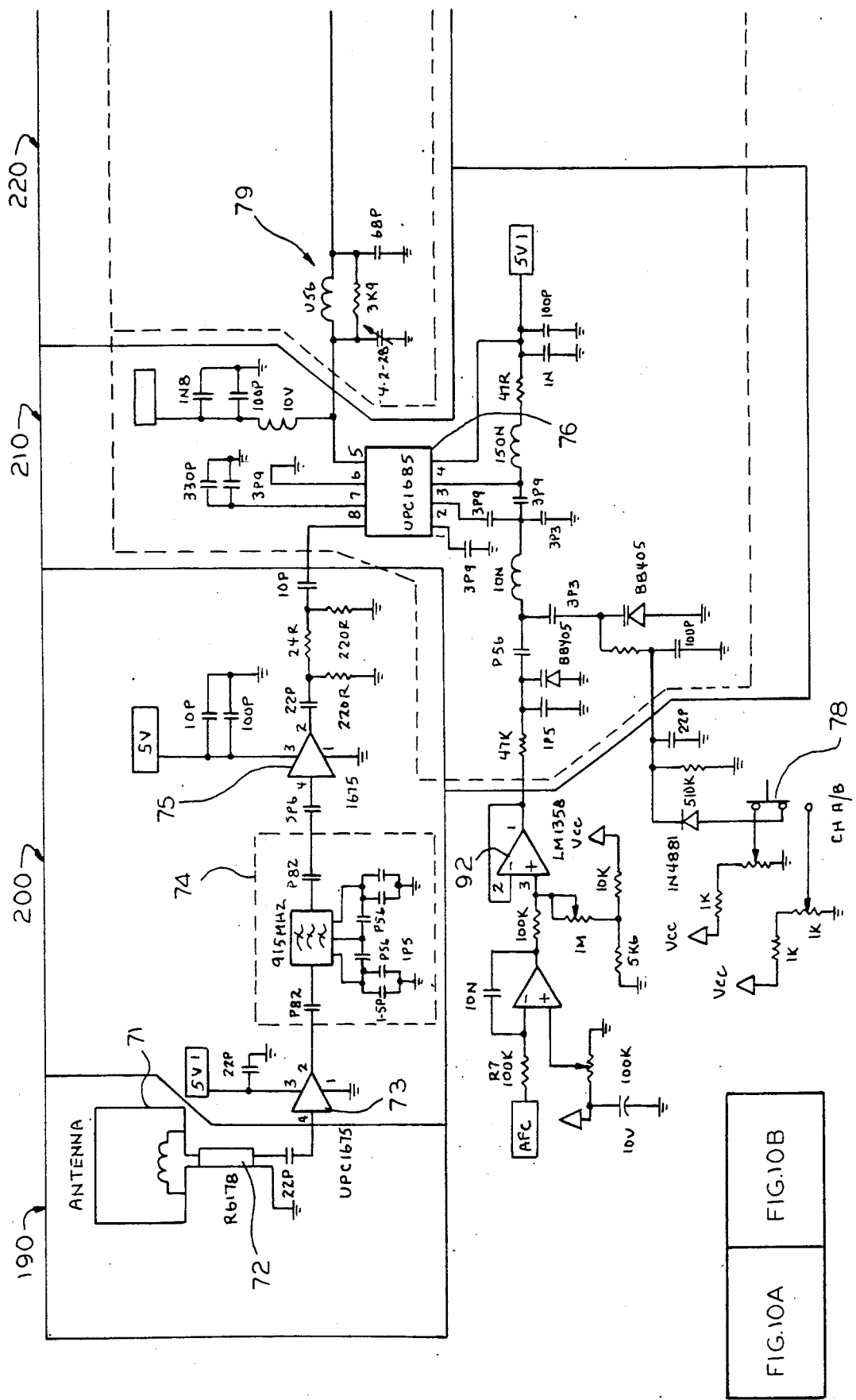
FIG. 10 of the drawings is composed of FIGS. 10A and 10B.
FIGS. 10A and 10B are schematic circuit diagrams illustrating the and receiver antenna means, down converter means, receiver filter means, modulated audio/video signal output means and modulated audio/video signal input connector means of the receiver means of the present invention.

FIG. 10A of the drawings illustrates receiver antenna means 190 comprising loop antenna 71 connected to coax cable section 72 shown comprising RG 178 coax cable which is used to connect the loop antenna to the circuitry of receiver 70. Amplifier 73 which is shown as comprising a UPC1675 hybrid AMP has an output which is connected to bandpass filter 74 which is in turn connected to high gain front end amplifier 75 a UPC1676 hybrid AMP, all of which comprise receiver front end means 200.

Down converter means 210 including down converter 76 is shown comprising a UPC1685 integrated circuit having contained therein local oscillator 77. Slide switch 78 is shown as being positionable between two voltages set by adjustable voltage dividers connected thereto which serves to select local oscillator frequencies and thus two RF channels of 914 MHz and 919 MHz.

The output of down converter 76 on pin 5 is shown connected to receiver filter means 220 including lowpass filter 79 composed of the inductor capacitor network illustrated. The signal is then fed into channel 3 amplifier 80 comprising a type 2N3904 transistor the output of which is connected to bandpass filter 81 composed of the inductor capacitor network illustrated.

Figure 10B:
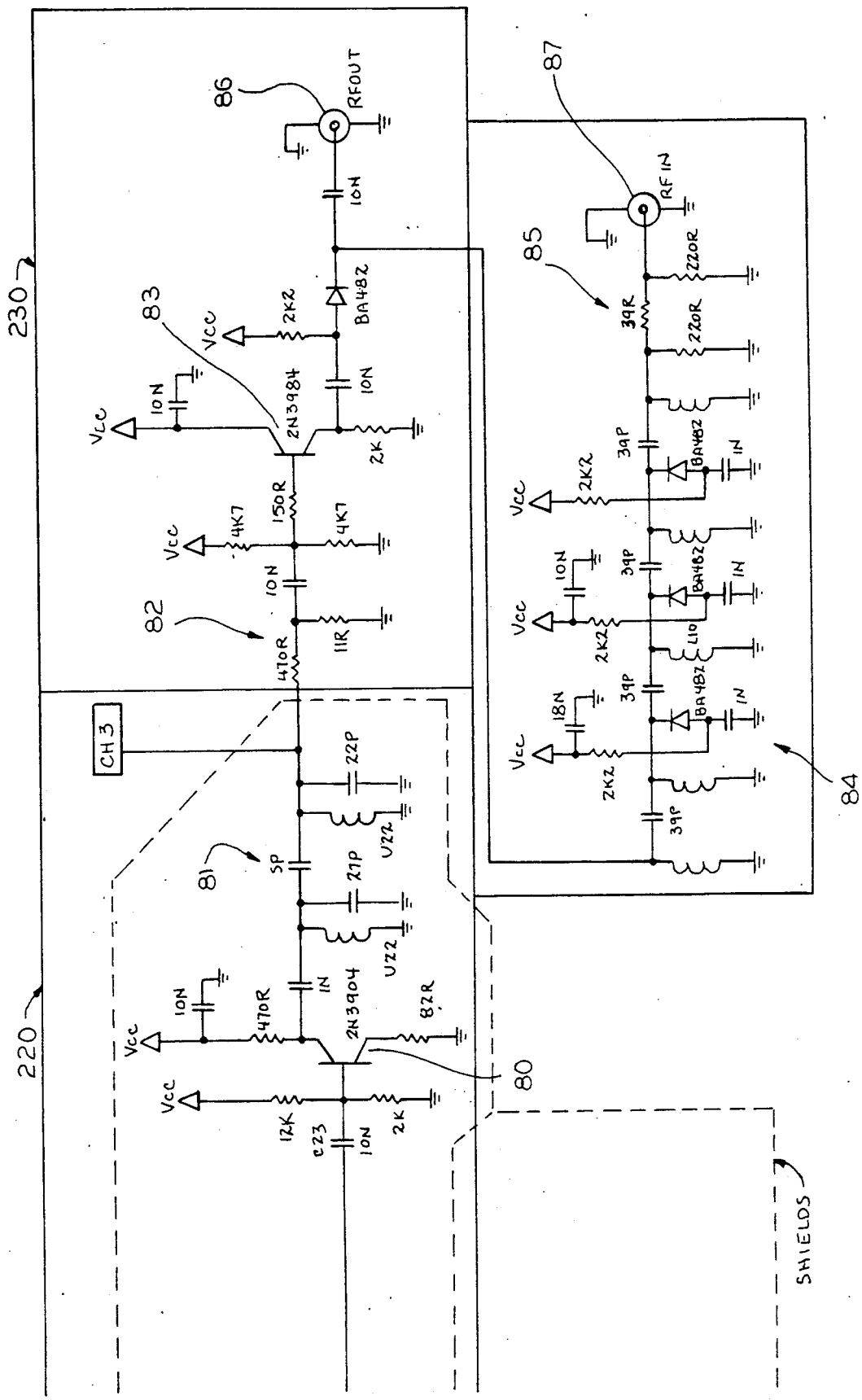

The output of bandpass filter 81 branches, one branch of which is illustrated in FIG. 10B and comprises modulated audio/video output means 230. Attenuator 82 transmits the signal to buffer 83, a type 2N3904 transistor. The output of buffer 83 is shown connected to channel 3 output 86.

Cable input 87 is shown passing its signal through attenuator 85 which is a pi resistor network the output of which passes through transfer switch 84 as illustrated, transfer switch 84 is composed of three BA482 diodes which shunt the input signal on connector 87 to ground when receiver power VCC is turned on.

Figure 11B:
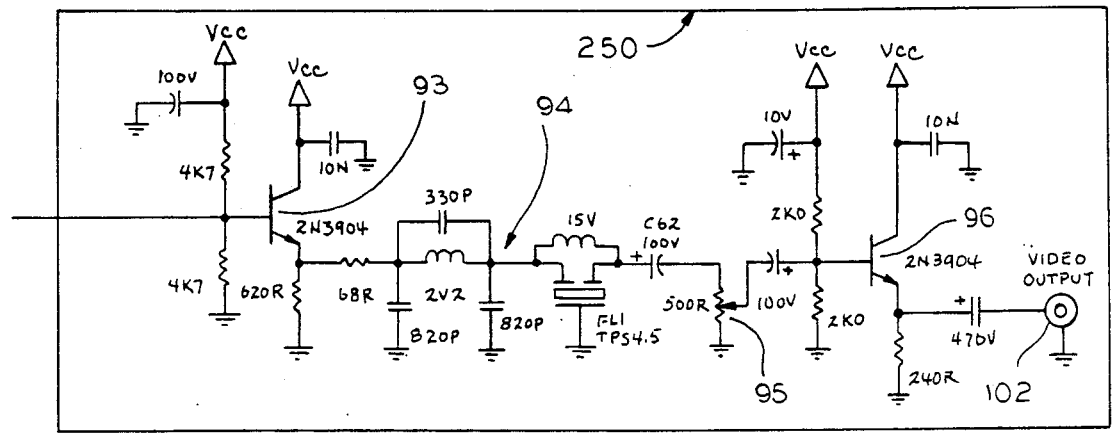
Figure 11B:
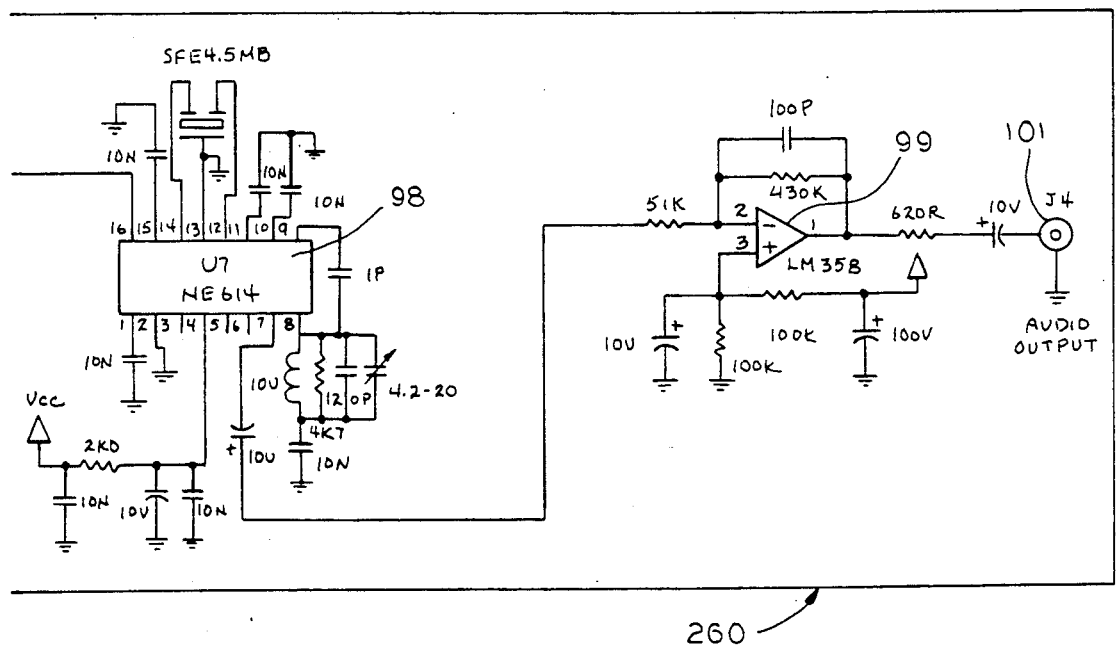

FIG. 11 of the drawings illustrates the other signal branch to the modulated audio/video demodulator means 240 which includes a 50 MHz highpass filter 90 composed of the inductor capacitor network illustrated. The output thereof is connected to channel 3 detector 91 a type TDA 2541 integrated circuit. The pin 12 output of which is connected to a baseband video section 250 and baseband audio section 260. The baseband video section 250 is shown comprising buffer 93 type 2N3904 transistor which in turn passes the signal through lowpass filter 94 to level control 95, a 500 Ohm variable resistor. The video signal then passes through buffer 96 a type 2N3904 transistor and from there is connected to video output terminal 102.

The other branch of the output from the channel 3 detector 91 passes through bandpass filter 97 which is in turn connected to sub-carrier demodulator 98 type NE614 integrated circuit which serves to demodulate the audio signal at 4.5 MHz. OP AMP LM358, 99, and the associated circuitry illustrated comprises an amplifier with a 75 microsecond de-emphasis characteristic the output of which is fed to audio output connector 101.

Figure 12:
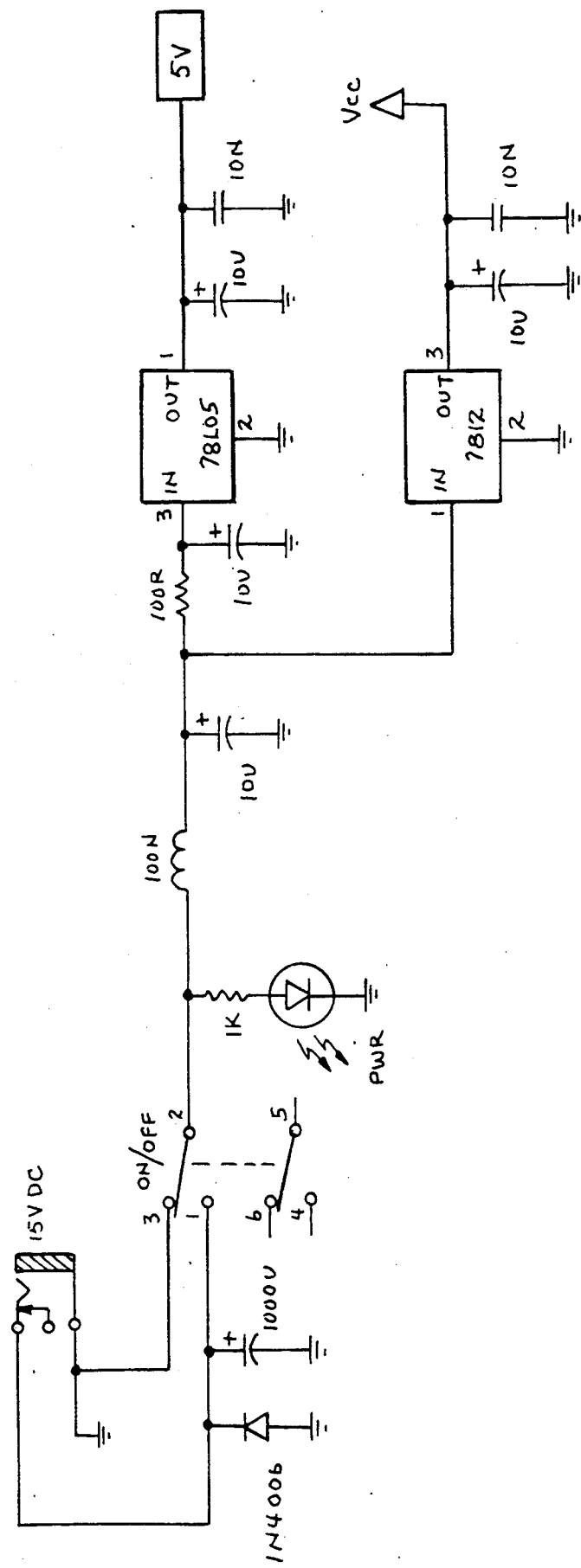

FIG. 12 of the drawings is a schematic diagram of the power supply circuitry for receiver 70 the operation of which is readily discernible to those skilled in the art.

The foregoing description and drawings merely explain and illustrate the invention and the invention is not limited thereto, except insofar as the appended claims are so limited and those skilled in the art who have the disclosure before them will be able to make modifications and variations therein without departing from the scope of the invention.

What is claimed is:

1. A wireless audio and video signal transmitter and receiver system capable of accepting both external baseband audio and video signal inputs and an external modulated audio/video signal input modulated at a particular television channel, wherein the transmitter transmits an audio/video signal to one or more remote receivers which regenerate the original audio/video signal providing both baseband audio and video signal outputs as well as a modulated audio/video signal output at said particular television channel, said wireless audio/video signal transmitter and receiver system comprising:

transmitter means for connection to audio/video signal sources and are capable of accepting said external modulated audio/video signal input as well as said external baseband audio and video signal inputs, said transmitter means including:

modulated audio/video signal input means for permitting an external audio/video modulated signal to be connected to said transmitter means, said modulated audio/video signal input means serving to convert said external modulated audio/video signal into a first internal baseband video signal and a first internal audio subcarrier signal corresponding to said external modulated audio/video signal input;

baseband audio signal input means for permitting an external baseband audio signal to be connected to said transmitter means, said baseband audio signal input means serving to convert said external baseband audio signal into a second internal audio subcarrier signal;

baseband video signal input means for permitting an external baseband video signal source to be connected to said transmitter means, said baseband video signal input means providing as an output a second internal baseband video signal;

video/RF switch means operably and electrically connected to said modulated audio/video signal input means, said baseband audio signal input means and said baseband video signal input means, said video/RF switch means serving to permit the selection between said first internal audio subcarrier signal and said second internal audio subcarrier signal, and said first internal baseband video signal and said second internal baseband video signal, thus providing for the alternative selection by the user between said external modulated audio/video signal input and said external baseband audio/video signal input in a manner which obviates the need for the use of an RF switch; said video/RF switch means providing an audio subcarrier audio signal output and a baseband video signal output;

video filter means operably and electrically connected to said baseband video signal output of said video/RF switch means providing a filtered video signal output;

AM modulator means electrically connected to said audio subcarrier signal output of said video/RF switch means and said filtered video signal output of said video filter means, said AM modulator means serving to AM modulate both said filtered video signal output and audio subcarrier signal output towards converting said signal outputs to a modulated IF frequency signal;

up converter means electrically connected to said AM modulator means for converting said modulated IF frequency signal to an RF frequency signal;

RF amplifier means electrically connected to said up converter means for amplifying said RF frequency signal;

transmitter antenna means electrically connected to said RF amplifier means for transmitting said amplified RF signal;

one or more receiver means capable of providing an external modulated audio/video signal output as well as external baseband audio signal and baseband video signal outputs, said one or more receiver means each including:

receiver antenna means for receiving said amplified RF signal transmitted by said transmitter means;

receiver front end means electrically connected to said receiver antenna means for amplifying and filtering said received RF signal;

down converter means electrically connected to said receiver antenna means, said down converter means serving to convert said received RF signal to an IF signal having a frequency corresponding to the carrier frequency for said modulated IF frequency signal;

receiver filter means electrically connected to said down converter means providing a filtered IF signal output;

modulated audio/video signal output means electrically connected to said receiver filter means for providing a modulated audio/video signal output on said particular television channel;

modulated audio/video signal demodulator means electrically connected to said receiver filter means, said modulated audio/video signal demodulator means serving to provide a composite audio and video output signal;

baseband audio signal output means, electrically connected to said modulated audio/video signal demodulator means, for providing a baseband audio signal output; and baseband video signal output means, electrically connected to said modulated audio/video signal demodulator means, for providing a baseband video signal output;

whereby said wireless audio/video signal transmitter and receiver system permits the wireless transmission and remote reception of audio/video signals from a signal source such as a VCR to a reception device such as a television monitor.

2. The wireless audio and video signal transmitter and receiver system according to claim 1 wherein said down converter means converts said received RF signal directly to an IF signal corresponding to the carrier frequency for television channel 3 of 61.25 MHz whereby said IF signal can be directly provided on the receiver means as a channel 3 television interface having a full double sideband signal resulting in minimal degradation in picture quality.

3. The wireless audio and video signal transmitter and receiver system according to claim 1 wherein said transmitter means transmits said audio/video signal on one of two user selectable RF channels of 914 MHz and 919 MHz by providing for the user selectable AM modulation at IF frequencies of 245 MHz and 250 MHz, which correspond to RF frequencies of 914 and 919 MHz.

4. The invention according to claim 1 wherein said one or more receiver means of said wireless audio and video signal transmitter and receiver system further includes modulated audio/video signal bypass means operably and electrically connected to said modulated audio/video signal output means of said receiver means, said modulated audio/video signal bypass means serving to connect said transmitted RF signal to the output of said modulated audio/video signal output means when said wireless audio and video signal transmitter and receiver system is in use and further serving to alternatively connect an external modulated audio/video signal source applied to said modulated audio/video signal bypass means to the output of said modulated audio/video signal output means when said wireless audio and video signal transmitter and receiver system is not in use.

5. The wireless audio and video signal transmitter and receiver system according to claim 1 wherein said modulated audio/video signal input means comprises:

modulated audio/video signal input connector means for accepting connection of said externally modulated audio/video input signal;

first modulated audio/video signal detector means for converting said external modulated audio/video input signal to a composite internal baseband video signal and audio subcarrier signal;

audio subcarrier filter and amplifier means electrically connected to said modulated audio/video signal detector means for removing unwanted video information from said audio subcarrier signal providing said first internal audio subcarrier signal; and video buffer means electrically connected to said modulated audio/video signal detector means providing said first internal baseband video signal.

6. The wireless audio and video signal transmitter and receiver system according to claim 1 wherein said baseband audio signal input means comprises:

baseband audio signal input connector for accepting connection of said external baseband audio signal;

pre-emphasis network means electrically connected to said baseband audio signal input connector, said pre-emphasis network means serving to boost high frequency components of said external baseband audio signal toward removing noise components from said signal when demodulated;

audio subcarrier modulator electrically connected to said pre-emphasis network means for modulating said external baseband audio signal generating an audio subcarrier signal output; and audio subcarrier signal buffer means electrically connected to said audio subcarrier modulator providing as an output said second internal audio subcarrier signal.

7. The wireless audio and video signal transmitter and receiver system according to claim wherein said baseband video signal input means comprises:

baseband video signal input connector for accepting connection of said external baseband video signal.

8. The wireless audio and video signal transmitter and receiver system according to claim 1 wherein said video/RF switch means comprises a DPDT switch the first half of which permits the selection between said first internal audio subcarrier signal and said second internal audio subcarrier signal, and the second half of which permits the simultaneous selection between said first internal baseband video signal and said second internal baseband video signal.

9. The wireless audio and video signal transmitter and receiver system according to claim 8 wherein said video filter means comprises:
baseband video filter amplifier electrically connected to said second half of said RF/video switch, baseband video filter buffer electrically connected to said baseband video filter amplifier; and baseband video filter lowpass filter electrically connected to said baseband video filter buffer, said baseband video filter amplifier, said baseband video filter buffer and said baseband video filter lowpass filter serving to remove unwanted audio subcarrier frequency components from said baseband video signal.

10. The wireless audio and video signal transmitter and receiver system according to claim 1 wherein said AM modulator means provides a double sideband output signal at 245 MHz or 250 MHz and further includes AM modulator balanced-to-unbalanced converter electrically connected to said AM modulator means, AM modulator bandpass filter electrically connected to said AM modulator balanced-to-unbalanced converter; AM modulator variable attenuator electrically connected to said AM modulator bandpass filter, AM modulator amplifier electrically connected to said AM modulator variable attenuator, AM modulator matching pad electrically connected to said AM modulator amplifier, and AM modulator lowpass filter electrically connected to said AM modulator matching pad towards removing spurious components from said modulated audio/video signal.

11. The wireless audio and video signal transmitter and receiver system according to claim 1 wherein said up converter utilizes a fixed local oscillator to convert said modulated audio/video signal to said RF signal.

12. The wireless audio and video signal transmitter and receiver system according to claim wherein said RF amplifier means comprises RF section bandpass filter electrically connected to said up converter means, RF section matching pad electrically connected to said RF section bandpass filter, RF section amplifier electrically connected to said RF section matching pad; combination highpass/notch filter electrically connected to said RF section matching pad; RF section matching amplifier means electrically connected to said combination highpass/notch filter; and RF section lowpass filter electrically connected to said RF section matching amplifier means.

13. The wireless audio and video signal transmitter and receiver system according to claim 1 wherein said receiver front end means comprises input amplifier means, input bandpass filter means and high gain input amplifier, connected in series, said receiver front end means serving to amplify and filter said received RF signal.

14. The wireless audio and video signal transmitter and receiver system according to claim 1 wherein said receiver filter means comprises receiver filter lowpass filter electrically connected to said down converter means, receiver filter amplifier electrically connected to said receiver filter lowpass filter, and receiver filter bandpass filter electrically connected to said receiver filter amplifier toward eliminating undesired frequency components above and below said external modulated audio/video signal and frequency components generated by said down converter means.

15. The wireless audio and video signal transmitter and receiver system according to claim 1 wherein said modulated audio/video signal output means comprises: modulated audio/video signal output attenuator electrically connected to said receiver means for controlling signal strength, modulated audio/video signal output buffer electrically connected to said attenuator and modulated audio/video output signal connector electrically connected to said modulated audio/video signal output buffer.

16. The wireless audio and video signal transmitter and receiver system according to claim 1 wherein said modulated audio/video signal demodulator means comprises: audio/video signal demodulator highpass filter electrically connected to said receiver filter means, second modulated audio/video signal detector means for providing said composite audio/video output signal corresponding to said modulated audio/video signal input to said transmitter means, said second detector means electrically connected to said audio/video signal demodulator highpass filter.

17. The wireless audio and video signal transmitter and receiver system according to claim 1 wherein said baseband audio signal output means comprises: audio subcarrier bandpass filter electrically connected to said modulated audio/video signal demodulator means for filtering out unwanted video signal components, audio output audio subcarrier demodulator means electrically connected to said audio output bandpass filter for demodulating the audio subcarrier signal and converting said audio subcarrier signal to said baseband audio signal, audio output amplifier electrically connected to said audio subcarrier detector, and de-emphasis means electrically connected to said amplifier.

18. The wireless audio and video signal transmitter and receiver system according to claim 1 wherein said baseband video signal output means comprises: video output buffer electrically connected to said modulated audio/video signal demodulator means, video output lowpass filter electrically connected to said video output buffer for filtering out undesired audio components of said video signal; video output level control means electrically connected to said video output lowpass filter; and final video output buffer electrically connected to said video output level control means.

19. The wireless audio and video signal transmitter and receiver system according to claim 5 wherein said modulator audio/video signal input means further includes modulated audio/video signal output connector electrically connected to said audio/video signal input connector for providing a modulated audio/video signal output signal corresponding to said modulated audio/video signal input signal.

20. The wireless audio and video signal transmitter and receiver system according to claim 6 wherein said baseband audio signal input means further includes baseband audio signal output connector electrically connected to said baseband audio signal input connector for providing a baseband audio signal output corresponding to said baseband audio signal input.

21. The wireless audio and video signal transmitter and receiver system according to claim 7 wherein said baseband video signal input means further includes baseband video signal output connector electrically connected to said baseband video signal input connector for providing a baseband video signal output corresponding to said baseband video signal input.

* * * * *

UNITED STATES PATENT AND TRADEMARK OFFICE
CERTIFICATE OF CORRECTION

PATENT NO. : 5,047,860

DATED : September 10, 1991

INVENTOR(S) : Gary Rogalski

It is certified that error appears in the above-identified patent and that said Letters Patent is hereby corrected as shown below:

Col. 8, Line 26   Delete "the and receiver" and instead insert --the receiver--

Col. 16, Line 51   Delete "said signal" and instead insert --said external baseband audio signal--

Col. 17, Line 41   Delete "claim wherein" and instead insert --Claim 1 wherein--

Signed and Sealed this

Twenty-third Day of February, 1993

Attest:

STEPHEN G. KUNIN

*Attesting Officer*    Acting Commissioner of Patents and Trademarks